F. P. HUNT.
Stovepipe Drum.
No. 54,911.
Patented May 22, 1866.
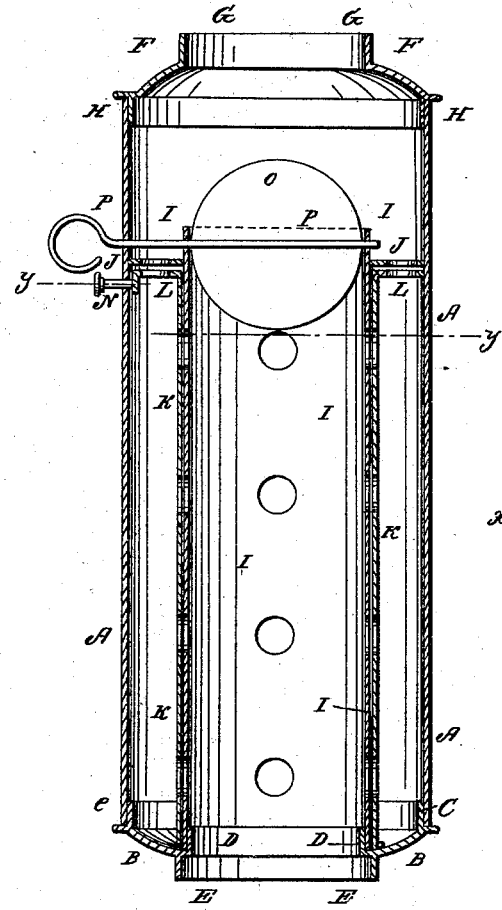
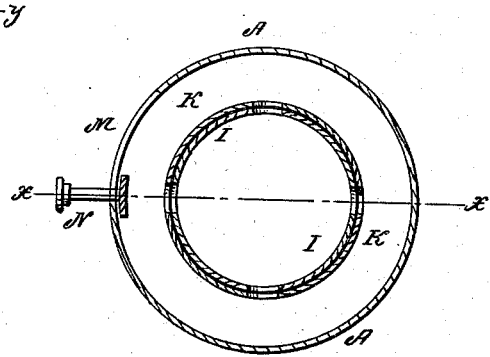
Witnesses:
Inventor:

UNITED STATES PATENT OFFICE.

FRANK P. HUNT, OF MEDINA, NEW YORK.

STOVE-PIPE DRUM.

Specification forming part of Letters Patent No. 54,911, dated May 22, 1866.

*To all whom it may concern:*

Be it known that I, FRANK P. HUNT, of Medina, Orleans county, State of New York, have invented a new and useful Improvement in Stove-Pipe Heater and Damper; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved heater and damper, taken through the line $y\,y$, Fig. 2. Fig. 2 is a cross-section of the same, taken through the line $y\,y$, Fig. 1.

Similar letters of reference indicate like parts.

My invention has for its object to utilize the heat that is usually wasted by passing up the chimney, and at the same time to completely regulate the draft of the stove; and it consists, first, of the combination of two interior perforated flanged cylinders with each other and with the exterior cylinder; and, second, in the combination, with the interior and exterior cylinder, of a damper, as hereinafter more fully described.

The size of the heater will depend upon the size of the stove to the pipe of which the heater is attached. The dimensions that I shall give in this description will therefore be considered simply as suggesting proportional dimensions.

A is the exterior cylinder, which is made of sheet-iron, and is eight and a half inches in diameter and twenty inches in length.

The bottom head or end piece, B, is made of cast-iron, with projecting flanges C, D, and E. The flange C fits into the lower end of the cylinder A. The flange D fits into the interior cylinder. The flange E projects downward, and when the heater is attached to the stove said flange may rest upon the top of the stove or fit into the top of a cylinder-stove, rendering a separate top to the stove unnecessary; or it may receive the upper end of the pipe which connects the said heater to the stove.

The upper head or end piece, F, is also made of cast-iron, and has two flanges, one projecting upward and the other downward. The upper flange, G, fits into the lower end of the stove-pipe connecting the heater to the chimney. The lower flange, H, fits into the upper end of the cylinder A.

I is the interior one of the two interior perforated cylinders. This cylinder is made of sheet-iron, and is four and a half inches in diameter.

J is a cast-iron perforated disk, immovably attached to the outside of the cylinder F about an inch below its upper end, and to the inside of the outer cylinder, A, about four inches below its top, as shown in the drawings.

The perforated cylinder K is made of sheet-iron, is about an inch shorter than the cylinder I, and fits closely around it.

To the upper end of the cylinder K is immovably attached a cast-iron perforated disk, L. The disk L and the cylinder K revolve around the cylinder I.

In the cylinder A, opposite the edge of the disk L, is made a horizontal slot, as seen at M, Fig. 2. Through this slot is passed a handle, N, which is screwed into the edge of the said disk L, and by which the disk and cylinder are revolved.

O is a damper, pivoted to the end of the cylinder I by the rod P, which passes out through the cylinder A, as shown in Fig. 1, and is bent over so as to form a handle for operating the said damper O.

When the damper is turned across the cylinder I and the disk L and cylinder K revolved into the position shown in the drawings, so that the holes formed in the cylinders and disks may correspond, the heat and smoke will pass through the holes in the cylinders and be projected against the cylinder A, heating it, and thus transmitting the heat to the room. If, now, the cylinder K and disk L be revolved so that the solid parts of the one disk and cylinder may cover the holes in the other, the draft of the stove will be wholly checked; but by operating the damper O the draft may be regulated as desired.

I claim as new and desire to secure by Letters Patent—

1. The interior perforated cylinders I and K and the perforated disks J and L, constructed and arranged substantially as described, in combination with each other and with the exterior cylinder, A, substantially as and for the purpose set forth.

2. The combination of the damper O with the interior cylinder, I, and the exterior cylinder, A, substantially as described, and for the purpose set forth.

FRANK P. HUNT.

Witnesses:
LINA BEECHER,
GEO. J. AVERILL.